(12) United States Patent
Kim et al.

(10) Patent No.: US 8,576,792 B2
(45) Date of Patent: Nov. 5, 2013

(54) METHOD FOR PROCESSING AND TRANSMITTING DATA PACKET

(75) Inventors: Ki Hwan Kim, Goyang-si (KR); Jae Hoon Chung, Yongin-si (KR); Yeong Hyeon Kwon, Daejeon (KR)

(73) Assignee: LG Electronics Inc., Seoul (KR)

( * ) Notice: Subject to any disclaimer, the term of this patent is extended or adjusted under 35 U.S.C. 154(b) by 245 days.

(21) Appl. No.: 13/140,962

(22) PCT Filed: Aug. 28, 2009

(86) PCT No.: PCT/KR2009/004808
§ 371 (c)(1),
(2), (4) Date: Jun. 20, 2011

(87) PCT Pub. No.: WO2010/082720
PCT Pub. Date: Jul. 22, 2010

(65) Prior Publication Data
US 2011/0317637 A1    Dec. 29, 2011

Related U.S. Application Data

(60) Provisional application No. 61/145,099, filed on Jan. 15, 2009, provisional application No. 61/145,114, filed on Jan. 16, 2009, provisional application No. 61/146,646, filed on Jan. 22, 2009.

(30) Foreign Application Priority Data

Jun. 2, 2009 (KR) .................. 10-2009-0048539

(51) Int. Cl.
*H04B 7/216* (2006.01)
*H04W 4/00* (2009.01)
*G08C 25/02* (2006.01)

(52) U.S. Cl.
USPC ............ 370/329; 370/328; 370/335; 714/748

(58) Field of Classification Search
USPC .......... 370/312–329, 336–401; 375/295–298; 714/748–751
See application file for complete search history.

(56) References Cited

U.S. PATENT DOCUMENTS

| | | | |
|---|---|---|---|
| 7,508,792 B2 * | 3/2009 | Petrovic et al. | 370/331 |
| 7,848,279 B2 * | 12/2010 | Ranta-aho et al. | 370/328 |
| 7,996,744 B2 * | 8/2011 | Ojala et al. | 714/748 |
| 8,301,956 B2 * | 10/2012 | Pi et al. | 714/749 |

(Continued)

FOREIGN PATENT DOCUMENTS

| | | |
|---|---|---|
| EP | 1 657 844 | 11/2004 |
| EP | 1 657 844 A1 | 5/2006 |

OTHER PUBLICATIONS

International Search Report dated Apr. 21, 2010.

(Continued)

*Primary Examiner* — M. Phan
(74) *Attorney, Agent, or Firm* — Morgan, Lewis & Bockius LLP

(57) ABSTRACT

A method for processing and transmitting data packet is disclosed. The method includes receiving a data packet with a first Redundancy Version (RV) from a serving cell, receiving a data packet with a second RV different from the first RV from a collaborative cell, and combining and decoding the data packets received from the serving cell and the collaborative cell.

10 Claims, 9 Drawing Sheets

(56) References Cited

U.S. PATENT DOCUMENTS

| | | |
|---|---|---|
| 2003/0110436 A1* | 6/2003 | Golitschek Edler Von Elbwart et al. .............................. 714/748 |
| 2005/0105494 A1* | 5/2005 | Kim et al. ..................... 370/335 |
| 2006/0064625 A1* | 3/2006 | Klein et al. ................... 714/776 |
| 2007/0025345 A1* | 2/2007 | Bachl et al. ................... 370/389 |
| 2007/0255994 A1* | 11/2007 | Michel et al. ................. 714/751 |
| 2008/0313521 A1 | 12/2008 | Frederiksen et al. ........... 714/48 |
| 2010/0107028 A1* | 4/2010 | Gorokhov et al. ............ 714/748 |
| 2010/0271999 A1* | 10/2010 | Yu et al. ........................ 370/312 |
| 2011/0075611 A1* | 3/2011 | Choi ............................. 370/329 |

OTHER PUBLICATIONS

Notification of Transmittal of the International Search Report and the Written Opinion of the International Searching Authority, or the Declaration dated Apr. 21, 2010.

International Search Report from PCT/KR2009/004808 (PCT corresponding to present application).

* cited by examiner

Figure 5
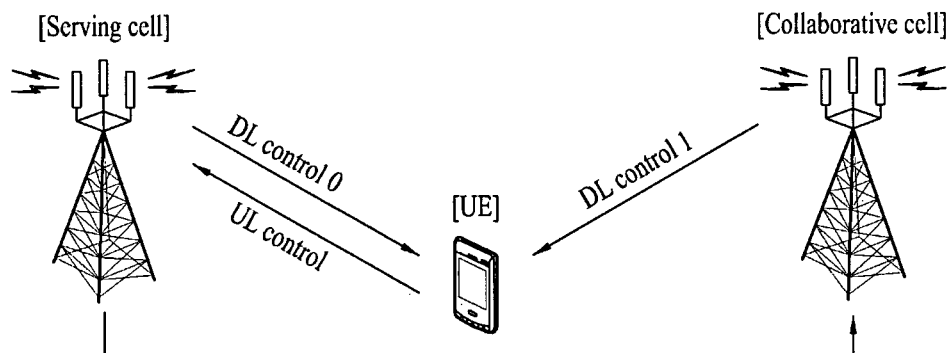
(a)
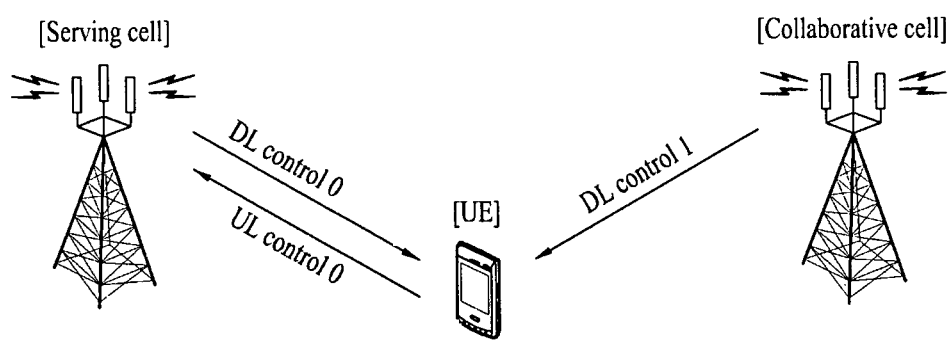
(b)
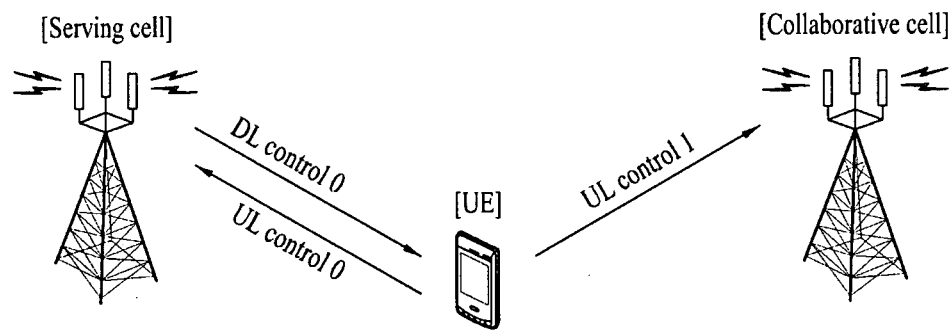
(c)

METHOD FOR PROCESSING AND TRANSMITTING DATA PACKET

The present application is a national stage of PCT International Application No. PCT/KR2009/004808 filed Aug. 28, 2009, and claims the benefit of U.S. Provisional Application Nos. 61/145,099, filed Jan. 15, 2009, 61/145,114, filed Jan. 16, 2009, and 61/146,646, filed Jan. 22, 2009. The present national stage application also claims the benefit of Korean Patent Application No. 10-2009-0048539, filed Jun. 2, 2009.

TECHNICAL FIELD

The present invention relates to a method for processing and transmitting a data packet.

BACKGROUND ART

In a wireless communication system, a variety of errors are inherent to radio signal propagation over the air, thus making data transmission difficult. Because a radio channel experiences multi-path fading, path loss that becomes serious as a User Equipment (UE) is farther from a Base Station (BS), etc. as well as thermal noise modeled as Additive White Gaussian Noise (AWGN), it is more difficult to transmit a signal reliably.

To ensure transmission reliability against various changes in channel status and errors during wireless communications, techniques such as 1) Forward Error Correction (FEC) or channel coding, and 2) Automatic Repeat reQuest (ARQ) or Hybrid Automatic Repeat reQuest (HARQ) are widely used.

Among them, HARQ will be described in brief.

FIG. 1 illustrates a signal flow referred to for describing the principle of HARQ.

Referring to FIG. 1, HARQ is a hybrid technology of conventional schemes in combination, that is, ARQ in the Medium Access Control (MAC) layer and channel coding in the physical layer. In HARQ, an erroneous initial transmission packet P1A is stored until a retransmission signal P1B is received because the initial transmission packet P1A retains information to a certain extent despite errors, and decoded after being soft-combined with the retransmission signal P1B or along with the retransmission signal P1B without soft combining.

The initial transmission signal P1A and the retransmission signal P1B are the same or different transmission packets created from the same channel encoder input P1. A packet P2A is produced from a new channel encoder input P2.

There are two types of HARQ schemes: Chase Combining (CC) and Incremental Redundancy (IR).

In CC HARQ, a retransmission packet is identical to previously transmitted packets with reception errors and soft-combined with them. This scheme is also called soft-combining HARQ.

FIG. 2 conceptually illustrates an exemplary packet transmission in CC HARQ.

Referring to FIG. 2, an original packet and a retransmission packet based on CC are shown. The original transmission signal that was turbo-encoded at a coding rate of 1/3 and punctured has 16 bits as illustrated in the left middle part of FIG. 2. If a transmitter receives a Negative ACKnowledgment (NACK) for the original transmission packet from a receiver, it retransmits a perfectly identical packet as illustrated in the right middle part of FIG. 2.

Since the same packets are transmitted at different time points, time diversity is effected and Signal-to-Noise Ratio (SNR) increases each time packets are combined, even though errors are generated in the CC HARQ scheme. Therefore, an error-free reception probability is increased.

FIG. 3 illustrates the concept of packet transmission in IR HARQ scheme.

Referring to FIG. 3, a retransmission packet has a different structure from a previous transmission packet with errors in IR scheme. As its appellation implies, the IR scheme increments redundancy at each transmission.

The IR HARQ scheme increases a channel coding gain or a repetition rate during rate matching, when a retransmission packet for an erroneous packet is transmitted. The resulting increase in valid channel coding gain adaptively increases the robustness of the retransmission packet against noise during retransmission. Because redundancy bits are increased in number and information bits are deceased in number in each retransmission packet in IR, an IR HARQ buffer is additionally used during the rate matching to handle a change in transmission rate during retransmission. A punctured packet illustrated in the left middle part of FIG. 3 is an original transmission packet.

In comparison between final decoder input signals illustrated in FIGS. 2 and 3, the CC decoder input contains information in a total of 16 bits, each bit having an increased SNR by soft combining, whereas the IR decoder input contains information in more bits than the CC decoder input, even though bit combining is not performed. Thus it can be concluded that IR HARQ usually outperforms CC HARQ.

These HARQ schemes increase reception SNR gradually because redundancy information increases at each retransmission by soft combining or IR. Even though the reception SNRs of individual transmissions may not meet a minimum requirement, a combination of a plurality of packets transmitted at repeated retransmissions has a final SNR satisfying the requirement. Accordingly, successful packet transmission is possible.

However, transmission of retransmission packets for a long time leads to an increased latency. In case of severe interference from neighbor cells, it often occurs that CC does not ensure its effectiveness.

DISCLOSURE

Technical Problem

An object of the present invention devised to solve the problem lies on a method for processing a data packet in a UE.

Another object of the present invention devised to solve the problem lies on a method for transmitting a data packet to a UE.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Technical Solution

The object of the present invention can be achieved by providing a method for processing a data packet received from at least one cell in a UE, including receiving a data packet with a first Redundancy Version (RV) from a serving cell, receiving a data packet with a second RV different from the first RV from a collaborative cell, and combining and decoding the data packets received from the serving cell and the collaborative cell.

The method may further include re-receiving a data packet with a third RV different from the first and second RVs from the serving cell, re-receiving a data packet with a fourth RV different from the first, the second and the third RVs from the collaborative cell, and combining and decoding the received data packets and the re-received data packets.

In another aspect of the present invention, provided herein is a method for transmitting a data packet to a UE, including transmitting a data packet with a first RV by a serving cell, and transmitting a data packet with a second RV different from the first RV by a collaborative cell. The data packets transmitted from the serving cell and collaborative cell are to be combined and decoded by the UE.

Advantageous Effects

In the data packet processing and transmitting method according to the present invention, a UE increases decoding performance, thus providing a more stable service.

The hardware complexity and power consumption of the UE can be reduced because decoders can be configured for a single signal in terms of number and capacity in the UE.

The UE can receive a signal by selecting a configuration for the signal freely. Therefore, both a low-power operation and a high-speed operation are applicable to the same signal.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 5 illustrates methods for transmitting and receiving control information in the serving cell and the collaborative cell that operate in the CoMP mode.

BEST MODE

Figure 1:
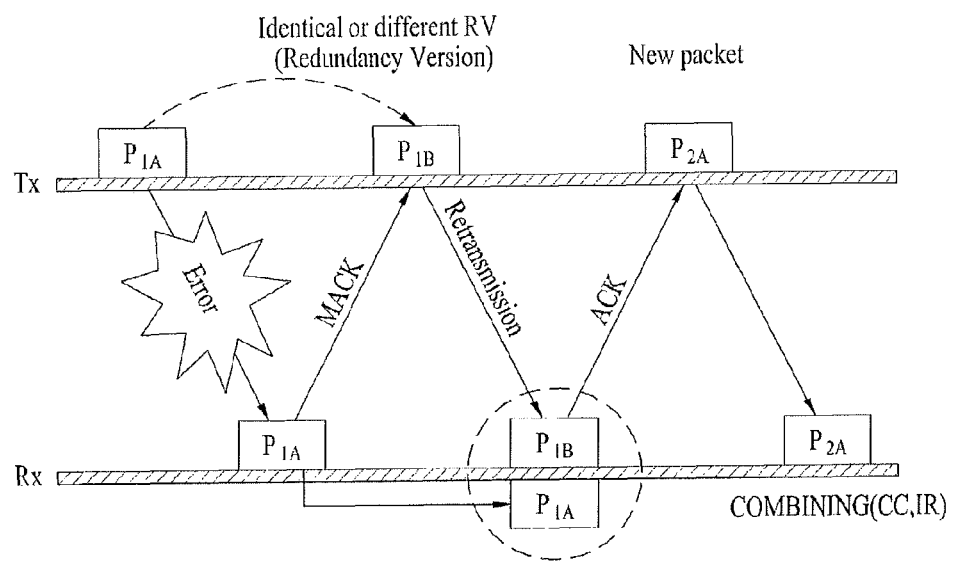
FIG. 1 illustrates a signal flow referred to for describing the principle of Hybrid Automatic Repeat reQuest (HARQ).
Figure 2:
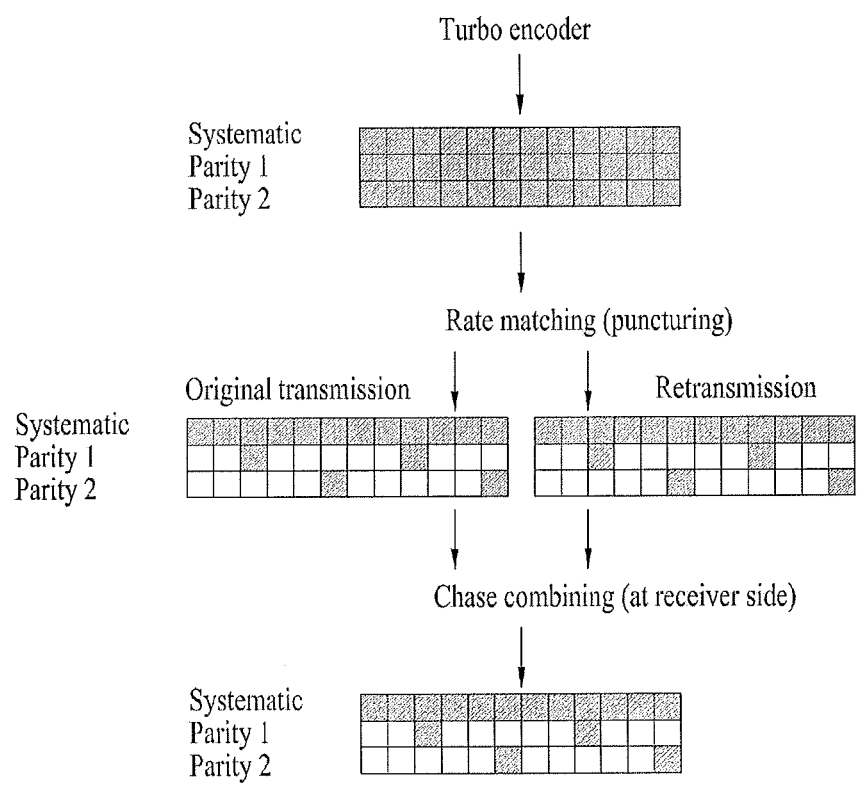
FIG. 2 conceptually illustrates an exemplary packet transmission in Chase Combining (CC) HARQ.
Figure 3:
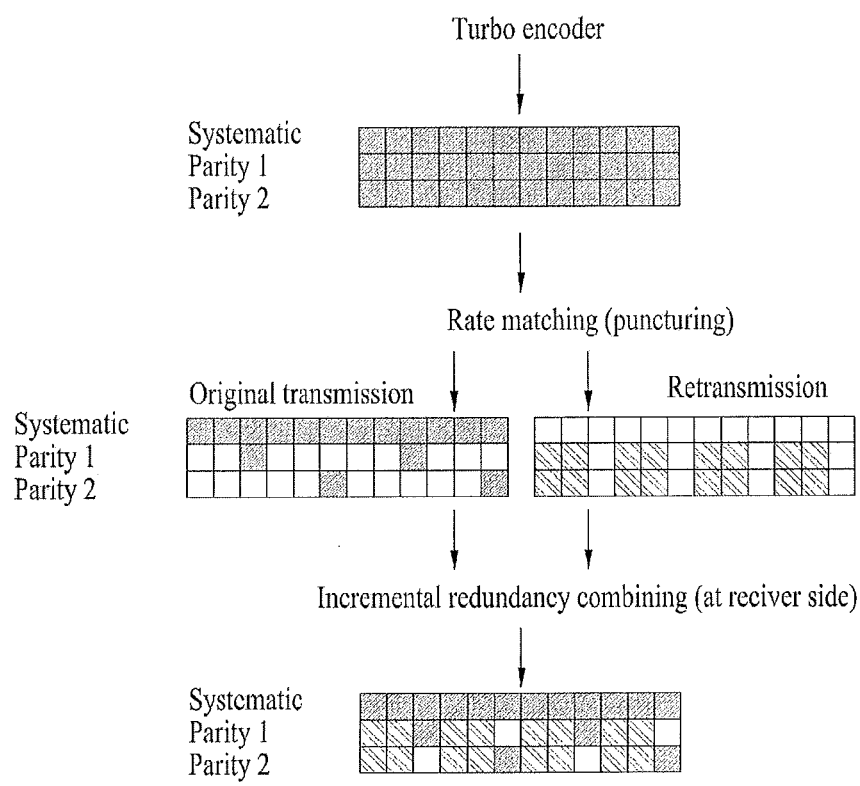
FIG. 3 illustrates the concept of packet transmission in Incremental Redundancy (IR) HARQ.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering around specific terms, but the present invention is not limited thereto and any other terms may be used to represent the same meanings. Wherever possible, the same reference numbers will be used throughout this specification to refer to the same or like part.

Throughout the specification, when it is said that a certain part "includes" a specific component, this implies that the certain part may further include other components, rather than it excludes other components, unless otherwise specified.

The later-described techniques are applicable to various communication systems. These communication systems can provide a variety of communication services including voice, packet data, etc. The techniques can be used on a downlink or an uplink. The term 'BS' may be replaced with the term 'evolved Node B (eNB)', 'fixed station', 'Node B', 'access point', 'Advanced Base Station (ABS)', etc. The term 'Mobile Station (MS)' may be replaced with the term 'User Equipment (UE)', 'Subscriber Station (SS)', 'Mobile Subscriber Station' (MSS), 'Advanced Mobile Station (AMS)', 'mobile terminal', etc.

A transmitting end refers to a node which transmits a data or voice service and a receiving end refers to a node which receives a data or voice service. Therefore, in uplink, a mobile station may correspond to the transmitting end and a base station may correspond to the receiving end. Similarly, in downlink, the mobile station may correspond to the receiving end and the base station may correspond to the transmitting end.

A mobile station of the present invention may be a personal digital assistant (PDA), a cellular phone, a personal communication service (PCS) phone, a global system for mobile (GSM) phone, a wideband code division multiple access (wideband CDMA) phone, a mobile broadband system (MBS) phone, etc.

Exemplary embodiments of the present invention can be supported by standard documents disclosed for at least one of wireless access systems, that is, an Institute of Electrical and Electronics Engineers (IEEE) 802 system, a 3rd Generation Partnership Project (3GPP) system, a 3GPP Long Term Evolution (LTE) system, and a 3GPP2 system. In other words, steps or parts that are not described to clarify the technical spirit of the present invention can be supported by the standard documents. Also, all the phraseology and terminology used herein can be explained by the standard documents.

Especially the exemplary embodiments of the present invention can be supported by documents such as a TS25 family, a TS36 family, a C.S000x family, etc. which are standard documents for 3GPP and 3GPP2 systems.

In the following description, specific terms are used to help understanding of the present invention and they can be replaced with other terms within the scope and spirit of the present invention.

A Coordinated Multi-Point (CoMP) system refers to a system in which to improve communication performance between a BS (cell or sector) and a UE located in a shadowing area, two or more BSs or cells communicate with the UE, in cooperation with each other.

The CoMP system may increase the throughput of a user at a cell boundary by appling improved Multiple-Input Multiple-Output (MIMO) transmission in a multi-cell environment. Hence, the use of the CoMP system may reduce inter-cell interference and a UE can receive data from multi-cell BSs in the multi-cell environment.

Since each BS supports one or more UEs simultaneously using the same radio frequency resources, system performance may be improved. Furthermore, the BS may implement Space Division Multiple Access (SDMA) based on the channel state information between the BS and UEs.

In the CoMP system, a serving cell and one or more collaborative cells may be connected to a scheduler through a backbone network. The scheduler may operate based on feedback information about the channel statuses between each UE (UE 1, UE 2, ..., UE K) and collaborative cells, which were measured by each BS (BS 1, BS 2, ..., BS M) and received over the backbone network. For example, the scheduler may schedule information required for a collaborative MIMO operation of the serving cell and the one or more collaborative cells. That is, the scheduler may directly transmit signaling (indication)s in relation to a collaborative MIMO operation to each BS.

In the CoMP system, cells managed by the same BS that a specific UE belongs to may exchange information such as data, channel state information, etc. via internal interfaces or x2 interfaces, while cells managed by different BSs may exchange information through a backhaul.

There are two types of CoMP schemes: CoMP-Joint Processing (CoMP-JP), a collaborative MIMO scheme based on data sharing and CoMP-Coordinated Scheduling/beamforming (CoMP-CS).

In CoMP-JP scheme, a UE may receive data simultaneously from CoMP BSs at a time instant and combine the received data, to thereby increase reception performance.

In CoMP-CS scheme, the UE may receive data instantaneously from one BS. Scheduling or beamforming is performed in such a manner that interference from other BSs in a cluster to which the UE belongs is minimized.

That is, only one of a serving cell and a collaborative cell transmits a signal to the UE and the other cell may carry out beamforming or scheduling so that no interference occurs to the UE in the CoMP environment. Both the cells may transmit the same data to the UE. They may also transmit data in different MIMO streamtypes.

In the present invention, the term 'BS' may cover a cell (a sector or a type 1/2 relay) in concept.

A higher system takes charge of higher functions of a serving cell and a collaborative cell in a hierarchical structure and controls transmission of data and control information. This higher system may be usually a network entity. The serving cell is a cell that provides legacy important services to the UE and transmits and receives control information in a CoMP mode. In this context, the serving cell may be referred to as an anchor cell.

According to the present invention, the higher system is a higher entity above a BS (cell) in a hierarchical structure and performs higher functions. Also, the higher system controls transmission of data and control information.

The serving cell is a cell (a sector or a type 1/2 relay) managed by a BS, which provides legacy important services to the UE and transmits and receives control information in the CoMP mode. The serving cell may be referred to as an anchor cell that transmits and receives control information in the CoMP mode.

The collaborative cell is a cell that transmits data to the UE in conjunction with the serving cell in a CoMP transmission scheme. The collaborative cell and the serving cell may be under the same or different BSs. Collaborative cells may be locateded simultaneously within the same BS of the serving cell or different BSs from the BS of the serving cell.

Figure 4:
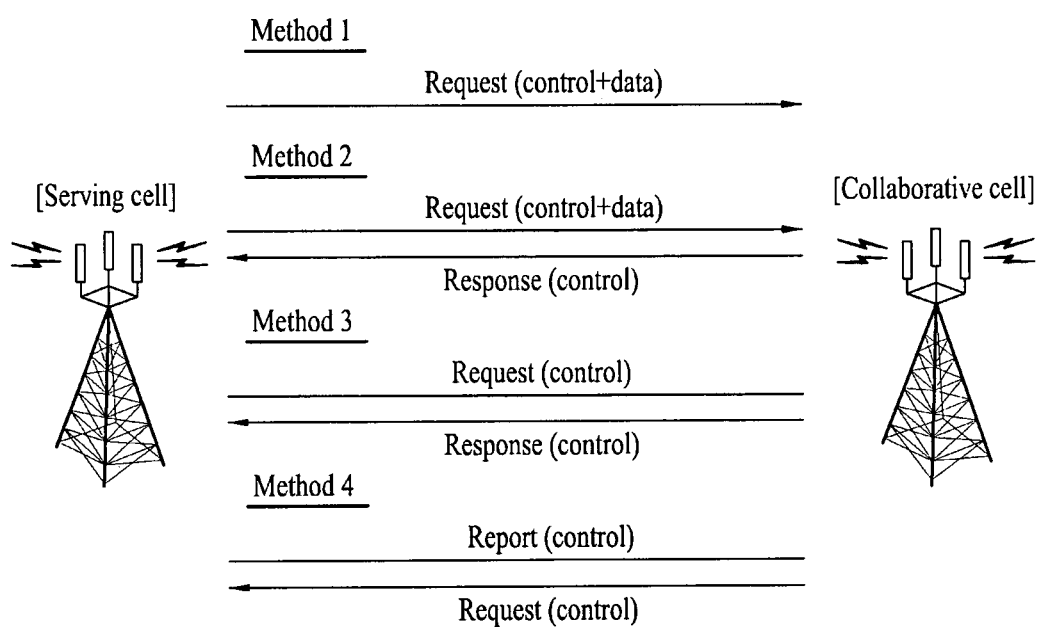
FIG. 4 illustrates methods for sharing control information used for data transmission to a User Equipment (UE) between a serving cell and a collaborative cell that operate in a Coordinated Multi-Point (CoMP) mode according to exemplary embodiments of the present invention.

FIG. 4 illustrates methods for sharing control information used for data transmission to a UE between a serving cell and a cooperative cell that operate in the CoMP mode according to exemplary embodiments of the present invention.

Methods illustrated in FIG. 4 explain how cells coordinate control information via an x2 interface in advance to transmit data to a UE.

Referring to FIG. 4, in Method 1, the serving cell may request transmission to the collaborative cell by transmitting control information required for data transmission and data to be transmitted at a predetermined timing to the collaborative cell In Method 2, when the serving cell requests transmission to the collaborative cell by transmitting control information required for data transmission and data to be transmitted at a predetermined timing to the collaborative cell, the collaborative cell may transmit a response to the request to the serving cell. The response may be a confirmation of the scheduling state of the collaborative cell before the collaborative cell transmits data to the UE.

In Method 3, the serving cell may request transmission to the collaborative cell by transmitting control information required for data transmission and the collaborative cell may transmit a response to the request to the serving cell. The response may be a confirmation of the scheduling state of the collaborative cell before the collaborative cell transmits data to the UE.

In Method 4, the serving cell and the collaborative cell may exchange scheduling information or control information required for collaborative transmission in a predetermined period or upon request, irrespective of a data transmission timing. Under this premise, the serving cell requests transmission to the collaborative cell by transmitting control information required for data transmission to the collaborative cell.

In the CoMP mode described above, it is preferable that the serving cell and the collaborative cell share information about resource assignment, a timing, and channel status information preliminarily, when the serving cell and the collaborative cell transmit data to the same UE. Also preferably, timing advance information as well as the transmission timing information is shared between the cells. The timing advance information indicates how much a specific cell is supposed to shift the timing, for data transmission.

The sharing and confirmation of control information between the cells enable appropriate CoMP transmission. The CoMP cells need to be synchronized to each other. That is, a synchronization process is needed between cells that perform a CoMP operation in a mode of transmitting information about the same uncoded packet, in a mode of transmitting information about different uncoded packets, or in a mode of sharing information about beam pattern formation and power control information, even though they operate perfectly independently.

The sharing of control information may lead to reliable data transmission from one or more cells to a UE on a CoMP downlink and enable support to Hybrid Automatic Repeat reQuest (HARQ).

FIG. 5 illustrates methods for transmitting and receiving control information at the serving cell and the collaborative cell that operate in the CoMP mode.

Referring to FIG. 5(a), the serving cell may transmit control information and information required for data transmission to the collaborative cell by control signaling via an internal interface when the serving cell and the collaborative cell are under the same BS or via an x2 interface when they are under different BSs.

The control information and the information required for data transmission may include a Redundancy Version (RV), resource block assignment information, a Modulation Coding Scheme (MCS), etc. used in data transmission to the UE. The serving cell may accomplish unity of control in the CoMP operation by transmitting the control information and the information required for data transmission to the UE.

If the serving cell is adjacent to the collaborative cell, data and control information may be transmitted between the cells without the aid of the higher system. That is, while the higherer system is excluded from the CoMP mode operation, autonomous CoMP data and control information may be transmitted between the cells via the internal interface or the x2 interface.

Referring to FIG. 5(b), the serving cell may transmit downlink control information to the UE. The downlink control information may include control information about data to be transmitted to the UE, such as an active set of cells that are participating or can participate in a CoMP operation, a transport format, a timing, resource assignment information, an HARQ procedure, etc. The downlink control information may further include control information about data that the collaborative cell transmit to the UE.

The collaborative cell may transmit control information about data that it will transmit to the UE or control information about data that the serving cell will transmit to the UE. That is, the control information transmitted from the serving cell may be identical to or different from the control information transmitted from the collaborative cell. If the control information transmitted from the serving cell and the collaborative cell is identical, the UE may decode the control information by combining it, thereby increasing the decoding performance of the control information.

Basically, control channels may be synchronized between cells during an initial transmission. However, control information transmitted from the cells may be asynchronous after the initial transmission due to the latency of a backbone network or other factors. That is, in a retransmission mode, the serving cell and the collaborative cell each generate and transmit control information according to a retransmission rule. Compatibility may be maintained between the control information by preliminarily exchanging information about a transport format, resource assignment, a timing, etc. for retransmission between the serving cell and the collaborative cell.

On the other hand, when the initial transmission is not accompanied by a retransmission, it may occur that the serving cell transmits a new packet but the collaborative cell may still in the retransmission mode.

On an uplink, the UE may report a transmission status to and support only the serving cell by transmitting control information such as a Channel Quality Indicator (CQI), a Precoding Matrix Indicator (PMI), a Rank Indicator (RI), an Acknowledgment/Negative Acknowledgment (ACK/NACK), etc.

Referring to FIG. 5(c), only the serving cell can transmit downlink control information to the UE. The serving cell may transmit the downlink control information about data to be transmitted to the UE, such as an active set of cells that are participating or can participate in CoMP, a transport format, a timing, resource assignment information, an HARQ procedure, etc. The serving cell may further transmit control information about data that the collaborative cell will transmit to the UE.

On a uplink, the UE may transmit to both the serving cell and the collaborative cell control information such as a CQI, a PMI, an RI, an ACK/NACK, etc.

In FIGS. 5(b) and 5(c), the downlink control information (DL control 0) that the serving cell transmits to the UE may be defined in a CoMP Downlink Control Information (DCI) format. The downlink control information may include an RV used in the serving cell, or RVs used in all cells that are involved in the CoMP mode operation. The RVs may be represented individually or in combination.

Downlink control information (DL control 1) that the collaborative cell transmits to the UE may also be defined in the CoMP DCI format. The downlink control information may include the RV of the serving cell or the collaborative cell, or the RVs of all cells that are involved in the CoMP mode operation. The RVs may be represented individually or in combination.

When only one RV is transmitted in at least one of the downlink control information (DL control 0) transmitted from the serving cell and the downlink control information (DL control 1) from the collaborative cell, the RVs of the serving and collaborative cells may be determined using an offset.

Also, the RVs of the serving and collaborative cells may be indicated by an predefined RV-combination index. That is, a changed RV may be indicated by an index listed in a table with RV combinations.

Figure 6:
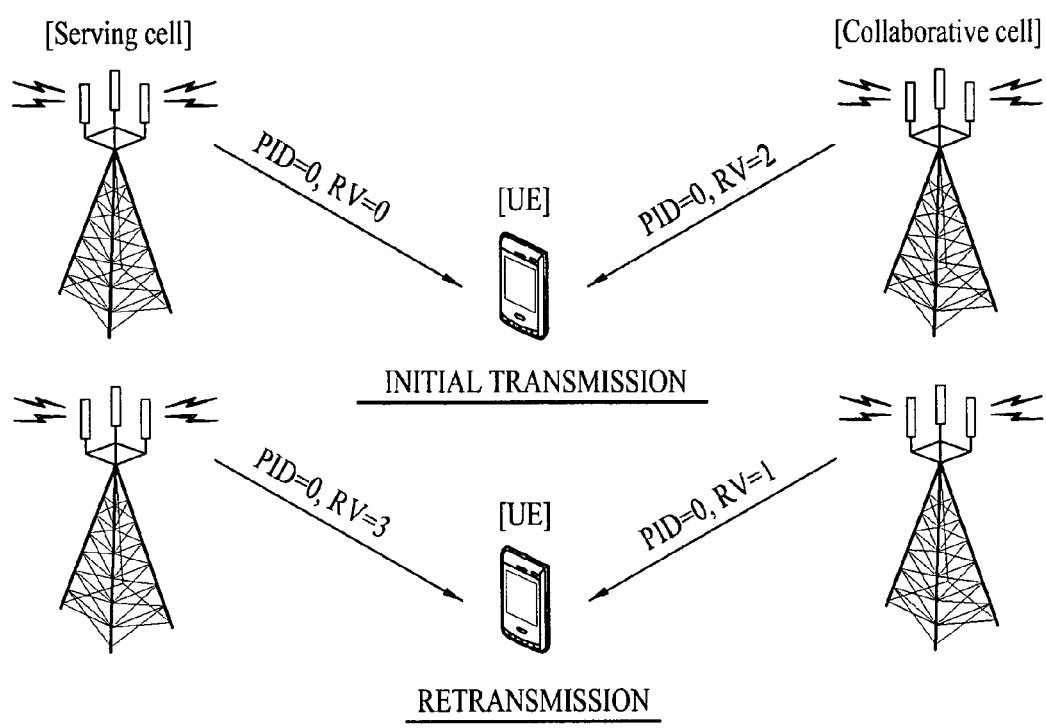
FIG. 6 illustrates the concept of supporting HARQ for a UE by one or more cells on a downlink CoMP.

FIG. 6 illustrates the concept of supporting HARQ scheme for a UE by one or more cells on a CoMP downlink.

Referring to FIG. 6, the serving cell and the collaborative cell transmit new data to the UE during an initial transmission. At the same time, the serving cell and the collaborative cell may transmit information about an uncoded packet. In actual implementation, the transmitted data packets may use different RVs or different channel coding structures. The UE may decode one or more data packets received from the serving and collaborative cells by combining them, or turbo-decode them, thereby increasing decoding performance.

Since a decoder may be configured for an uncoded packet (which may be defined as a transport block) irrespective of the number of cells, the hardware complexity of the UE can be alleviated. The serving cell may beforehand notify the collaborative cell of the structure (which may define the RV) of a packet to be transmitted from the collaborative cell or the collaborative cell may set a transport format (e.g. an RV) according to a predefined rule.

Upon receipt of an HARQ NACK for the initial transmission data or upon time-out, the serving cell and the collaborative cell may retransmit the data with the same Packet Identifier (PID). Despite the same PID, the retransmission data may have the same RV as or a different RV from a previous RV.

The UE then decodes the retransmission data in combination with the previous received data, thus increasing the decoding performance. If data with different RVs are decoded in combination, SNR is greatly increased. Also, since a decoder may be configured for an uncoded packet (which may be defined as a transport block) irrespective of the number of cells, the hardware complexity of the UE can be alleviated.

The serving cell may notify the collaborative cell of an RV to be used in the collaborative cell, or the RV may be set according to a predefined rule. Both Incremental Redundancy (IR) and Chase Combining (CC) are available herein. In IR, a different RV from a previous RV is used during retransmittion, whereas in CC, an RV identical to a previous RV is used during retransmittion.

In the case of a small number of RVs in the above method, that is, when the serving cell and the collaborative cell transmit different RVs of a codeword, the retransmission may be carried out by new channel coding, rather than RVs of the same codeword are retransmitted. For example, interleaving is performed in a different manner in the channel coding scheme of the initial transmission, or a different channel coding type is used for retransmission.

If the serving cell and the collaborative cell differ in terms of transmit power or channel quality, they may use different modulation orders or spreading factors, taking into account unequal protection, thus changing the reliability of each information symbol.

To optimize the RVs used in the serving cell and the collaborative cell, the numbers of RVs and their order may be changed (for example, to 0, 2, 3, 1, 0, 2, 3, 1, according to the length of a transport block and the coding rate of transmission data, compared to a legacy Long Term Evolution (LTE) system. Further, to achieve high performance, the serving cell may use RVO, while the collaborative cell may not, during the initial transmission.

In this manner, cells operating in the CoMP mode can transmit data reliably to a UE and support HARQ for the UE.

Figure 7:
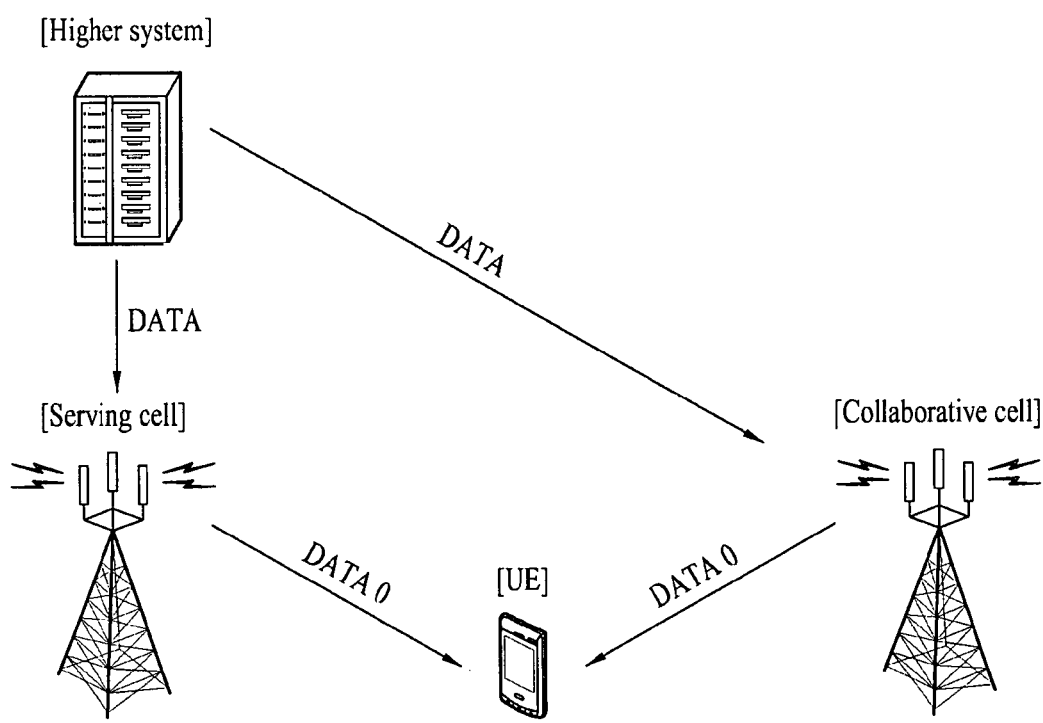
FIG. 7 illustrates the concept of supporting reliable data transmission and HARQ for a UE by one or more cells on a downlink CoMP, centering on data (a transport block).

FIG. 7 illustrates the concept of supporting reliable data transmission and HARQ scheme for a UE by one or more cells on a CoMP downlink, centering on data (a transport block).

Referring to FIG. 7, when a higher system transmits the same transport block or data including the same transport block to the serving cell and the collaborative cell, they may transmit the same transport block at the same timing to the UE. The UE then may decode data received from one or more cells in combination, thus increasing its decoding performance.

For reliable data reception at the UE, PMI setting may be changed so as to enhance channel quality between the collaborative cell and the UE. That is, the collaborative cell preferably applies beamforming for the UE to achieve the best received signal quality.

Although transmission data from the serving cell and the collaborative cell are based on the same information, they may share all or part of the systematic part of coded data and have segments of the whole or part of the parity part of the coded data during processing at coding chains.

For example, the transmission data from the serving cell may be composed of the systematic part and a parity part A, while the transmission data from the collaborative cell may be composed of the systematic part and a parity B. Also, the transmission data from the serving cell and the collaborative cell may be subjected to joint processing. That is, the data may be transmitted from multiple cells after at least one of joint coding and joint processing.

Only a single RV may be transmitted by signaling at least one of the downlink control information (DL control 0) from the serving cell and the downlink control information (DL control 1) from the collaborative cell. In this case, data or a codeword from the serving cell and data or a codeword from the collaborative cell may be preset or have offsets determined according to an Modulation Coding Scheme (MCS)/Transport Block (TB). Notably, a predetermined RV position may not be used in creating an RV of data or a codeword.

Embodiments according to present invention will be described in brief.

Figure 8:
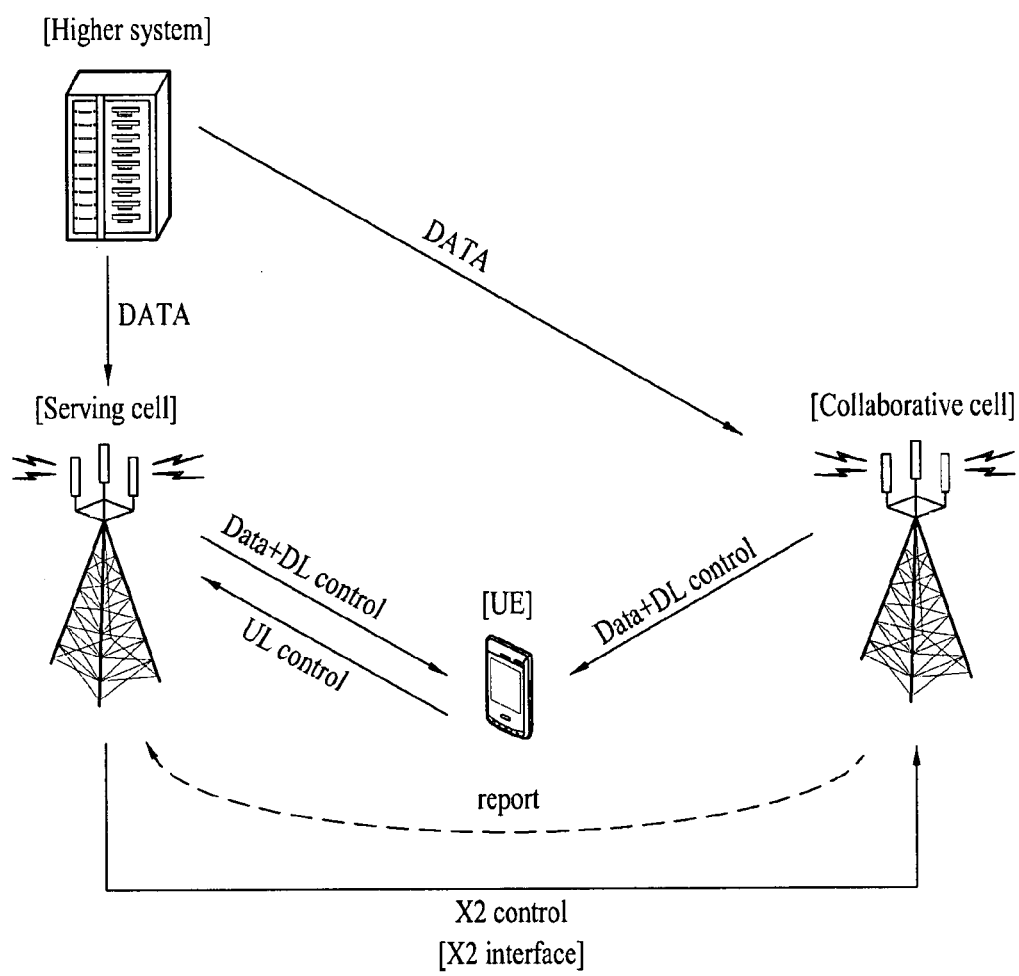
FIG. 8 illustrates an exemplary application of a downlink CoMP mode by a plurality of technical structures of the present invention in combination.

FIG. 8 illustrates an exemplary application of a downlink CoMP mode by a plurality of technical structures of the present invention in combination.

Referring to FIG. 8, the higher system may transmit the same transport block or data including the same transport block to the serving cell and collaborative cells. The serving cell may use scheduling information that neighbor cells, i.e. the collaborative cells have reported, prior to data transmission to the UE. The serving cell may transmit an RV, an MCS, resource block assignment information, timing information, etc. used in transport block transmission from each of the collaborative cell participating in the downlink CoMP mode transmission based on the scheduling information and make each collaborative cell to prepare for the data transmission.

Subsequently, the cells involved in the downlink CoMP mode transmission may transmit the same transport block in the same or different manners to the UE based on the timing information received from the serving cell. At the same time, the serving cell may transmit data and downlink control information about the data to the UE. The downlink control information may include control information by which to receive and recover the signals transmitted from the collaborative cells.

Each collaborative cell may transmit only data or both the data and control information about the data to the UE. The control information transmitted from the collaborative cell may include the same information included in the control information transmitted from the serving cell, or control information specific to the collaborative cell, or a combination of parts of the two pieces of control information.

Then the UE transmits a response to the downlink transmission or information necessary for downlink transmission to the serving cell only, so that the serving cell may have unity of control regarding transmission between cells and the UE.

The technical structures according to the present invention may be used in combinations or with partial modifications. They are also applicable to the downlink and the uplink, and to every case where a serving cell or one or more collaborative cells transmit data to a particular UE in a CoMP mode transmission scheme.

To be brief, when cells operating in the downlink CoMP mode transmit data to the UE, the cells may transmit the same transport block in various transmission schemes and the UE may decode them in combination.

If HARQ is implemented in the CoMP mode, the time taken for a retransmission is shortened and neighbor cell interference is eliminated.

Therefore, the UE can provide a more stable service with the resulting increased decoding performance. Also, since decoders may be configured for a single signal in terms of number and capacity, the hardware complexity and power consumption of the UE are decreased.

Figure 9:
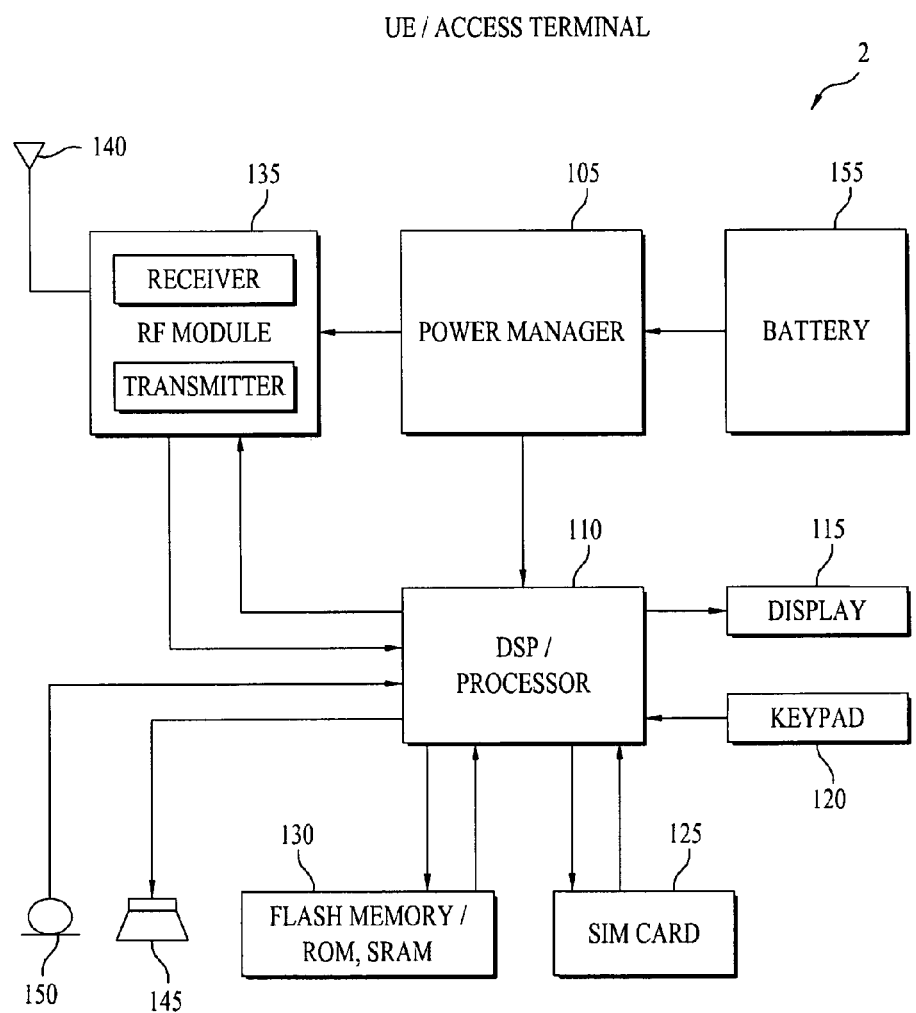
FIG. 9 is a block diagram of a UE or an access terminal according to an exemplary embodiment of the present invention.

FIG. 9 is a block diagram of a UE or an access terminal according to an exemplary embodiment of the present invention.

Referring to FIG. 9, the UE includes a processor (or a Digital Signal Processor (DSP)) 110, a Radio Frequency (RF) module 135, a power manager 105, an antenna 140, a battery 155, a display 115, a keypad 120, a memory 130, a Subscriber identification Module (SIM) card 125 (optional), a speaker 145, and a microphone 150.

The user enters command information such as a phone number by, for example, pressing buttons of the keypad 120 or by voice activation on the microphone 150. The processor 110 receives and processes the command information and performs an appropriate function such as dialing. For implementing the function, the processor 110 may retrieve operation data from the SIM card 125 or the memory 130. Also, the processor 110 may display command information and operation information on the display 115, for user reference and convenience.

The processor 110 may start communication by providing command information, for example, an RF signal including voice communication data. The RF module 135 includes a receiver and a transmitter, for radio reception and transmission. The antenna 140 facilitates the radio transmission and reception. Upon receipt of an RF signal, the RF module 135 downconverts the RF signal to a baseband signal and provides it to the processor 110.

The processed signal is converted to audible or readable information through the speaker 145, for example. The processor 110 has protocols and functions required to implement the above-described various operations.

The exemplary embodiments of the present invention may be achieved by various means, for example, hardware, firmware, software, or a combination thereof. In a hardware configuration, exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, a method for reporting a CQI in a wireless communication system according to exemplary embodiments of the present invention may be implemented in the form of a module, a procedure, a function, etc. performing the above-described functions or operations. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

MODE FOR INVENTION

Various embodiments have been described in the best mode for carrying out the invention.

INDUSTRIAL APPLICABILITY

The method for processing and transmitting a data packet according to the present invention is industrially applicable.

The invention claimed is:

1. A method for processing a data packet received from at least one cell in a User Equipment (UE), the method comprising:
receiving downlink control information from at least one of a serving cell and a collaborative cell;
receiving a data packet with a first Redundancy Version (RV) from the serving cell;
receiving a data packet with a second RV different from the first RV from the collaborative cell; and
combining and decoding the data packets received from the serving cell and the collaborative cell,
wherein the downlink control information includes at least one of: an active set indicating cells operating in a Coordinated Multiple Point (CoMP) mode, a transport format, a timing, resource assignment information, and a Hybrid Automatic Repeat reQuest (HARQ) procedure.

2. The method according to claim 1, further comprising:
re-receiving a data packet with a third RV different from the first and second RVs from the serving cell;
re-receiving a data packet with a fourth RV different from the first, second, and third RVs from the collaborative cell; and
combining and decoding the received data packets and the re-received data packets.

3. The method according to claim 1, wherein the downlink control information is received from the collaborative cell, and the downlink control information is regarding the data packet that the serving cell transmits.

4. The method according to claim 1, wherein the downlink control information received from the serving cell includes RV information used in the serving cell or RV information used in all cells operating in CoMP mode.

5. The method according to claim 1, wherein the second RV used in the collaborative cell is indicated from the serving cell.

6. The method according to claim the method according to claim 1, wherein the first RV and the second RV are predefined.

7. The method according to claim 1, wherein the data packets received from the serving cell and the collaborative cell share a whole or part of a systematic part and have segments of a whole or part of a parity part.

8. The method according to claim 1, wherein the data packets received from the serving cell and the collaborative cell are joint coding-processed.

9. A method for transmitting a data packet to a User Equipment (UE), the method comprising:
transmitting, to a collaborative cell, downlink control information including RV information to be used in the collaborative cell by a serving cell;
receiving downlink control information including a scheduling state confirmation from the collaborative cell by the serving cell;
transmitting a data packet with a first Redundancy Version (RV) by the serving cell; and
transmitting a data packet with a second RV different from the first RV by the collaborative cell,
wherein the data packets transmitted from the serving cell and the collaborative cell are combined and decoded by the UE, and
wherein the downlink control information transmitted or received by the serving cell includes at least one of: resource assignment information, a data transmission timing, beam pattern formation information, and power control information.

10. The method according to claim 9, further comprising transmitting data to be transmitted to the UE to the collaborative cell by the serving cell.

* * * * *